(12) United States Patent
Cho et al.

(10) Patent No.: US 8,014,598 B2
(45) Date of Patent: Sep. 6, 2011

(54) METHOD AND APPARATUS FOR CHANGING A PIXEL COLOR

(75) Inventors: Hwa-Hyun Cho, Seoul (KR); Bom-Yun Kim, Seoul (KR); Jong-Seon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 11/766,562

(22) Filed: Jun. 21, 2007

(65) Prior Publication Data

US 2008/0018801 A1 Jan. 24, 2008

(30) Foreign Application Priority Data

Jul. 18, 2006 (KR) .................... 10-2006-0067028

(51) Int. Cl.
*G06K 9/00* (2006.01)
(52) U.S. Cl. .................. 382/167; 348/708; 348/713
(58) Field of Classification Search .......... 382/162, 382/167; 348/708, 713
See application file for complete search history.

(56) References Cited

U.S. PATENT DOCUMENTS

| | | | |
|---|---|---|---|
| 4,812,902 A * | 3/1989 | Fuchsberger | 358/521 |
| 5,384,601 A * | 1/1995 | Yamashita et al. | 348/577 |
| 2002/0008780 A1 * | 1/2002 | Han | 348/554 |
| 2004/0114798 A1 * | 6/2004 | Park et al. | 382/167 |

FOREIGN PATENT DOCUMENTS

| | | |
|---|---|---|
| JP | 2001-111859 | 4/2001 |
| JP | 2002-077659 | 3/2002 |
| JP | 2004-064792 | 2/2004 |
| JP | 2005-184209 | 7/2005 |
| KR | 1020040051510 | 6/2004 |

OTHER PUBLICATIONS

English Abstract for Publication No. 2001-111859.
English Abstract for Publication No. 2002-077559.
English Abstract for Publication No. 2004-064792.
English Abstract for Publication No. 1020040051510.

* cited by examiner

*Primary Examiner* — Vikkram Bali
*Assistant Examiner* — Eueng-Nan Yeh
(74) *Attorney, Agent, or Firm* — F. Chau & Associates, LLC (57) ABSTRACT

A method of changing a pixel color includes determining whether a chrominance of a pixel is in a preference chrominance area, where the preference chrominance area is defined as a conic section in a two-dimensional chrominance plane and an eccentricity of the conic section is not greater than 1, and changing the chrominance of the pixel to a preference chrominance to generate a preference pixel when the chrominance of the pixel is in the preference chrominance area. Therefore, the method may set a preference chrominance area in a simple manner, and hardware for setting the preference chrominance area may be easily implemented.

15 Claims, 5 Drawing Sheets

METHOD AND APPARATUS FOR CHANGING A PIXEL COLOR

CROSS-REFERENCE TO RELATED APPLICATION

This application claims priority under 35 USC §119 to Korean Patent Application No. 2006-67028 filed on Jul. 18, 2006 in the Korean Intellectual Property Office (KIPO), the disclosure of which is incorporated herein in its entirety by reference.

BACKGROUND OF THE INVENTION

1. Technical Field

The present disclosure relates to image processing and, more particularly, to a method and an apparatus for changing a pixel color and an image displaying device including the apparatus for changing a pixel color.

2. Discussion of Related Art

There are many technologies for improving the quality of an image displayed through image displaying devices such as a television, a monitor, and a mobile device. For example, such technologies may include technology for eliminating noise and a technique for improving an edge characteristic of the displayed image.

Also, such technologies may include technology for changing an image color. A color preference desired by one user may be different from that of another user. Also, the color preference may be different according to the different image displaying devices.

With respect to technology for improving an image quality seen by the user, Korean Patent Application No. 20040051510 discloses technology for generating user preference data according to an image color characteristic. The conventional method may permit the user to obtain a preferable image. The disclosed technology does not, however, provide a method for determining a preference chrominance area in a two-dimensional chrominance plane. The preference chrominance area may be defined as a closed loop including pixels of to the color which does not need to be changed. Defining the preference chrominance area in a two-dimensional chrominance plane requires very complex operations and the technology requiring complex operations is not preferably employed in a mobile device or a portable device.

Therefore, methods of easily determining the preference chrominance area in a two-dimensional chrominance plane and changing a chrominance of the pixel to a preference chrominance are required.

SUMMARY OF THE INVENTION

Accordingly, exemplary embodiments of the present invention are provided to substantially obviate one or more problems due to limitations and disadvantages of the related art.

Exemplary embodiments of the present invention may provide a method of changing a pixel color capable of setting a preference chrominance area in a simple manner.

Exemplary embodiments of the present invention may provide an apparatus for changing a pixel color capable of simply setting a preference chrominance area.

Exemplary embodiments of the present invention may also provide an image displaying device including the apparatus for changing a pixel color.

In exemplary embodiments of the present invention, a method of changing a pixel color includes determining whether the chrominance of a pixel is in a preference chrominance area, where the preference chrominance area is defined as a conic section in a two-dimensional chrominance plane and an eccentricity of the conic section is not greater than 1, and changing the chrominance of the pixel to a preference chrominance to generate a preference pixel when the chrominance of the pixel is in the preference chrominance area. For example, the preference chrominance area may correspond to one of a circle and an ellipse.

Changing the chrominance of the pixel to the preference chrominance may include moving the chrominance of the pixel in a direction of a target chrominance based on a size of the circle or the ellipse and a distance between the chrominance of the pixel and the target chrominance in the two-dimensional chrominance plane.

The method may further include converting a format of the pixel from the RGB format to a luminance/chrominance format to provide the chrominance of the pixel, and converting a format of the preference pixel from a luminance/chrominance format to the RGB format. For example, the luminance/chrominance format may correspond to the YCbCr format.

The method may further include setting the preference chrominance area and may further include setting a target chrominance.

In exemplary embodiments of the present invention, an apparatus for changing a pixel color includes a chrominance area determination unit and a chrominance changing unit. The chrominance area determination unit is configured to determine whether chrominance of a pixel is in a preference chrominance area. The preference chrominance area is defined as a conic section in a two-dimensional chrominance plane and an eccentricity of the conic section is not greater than 1. The chrominance changing unit is configured to to change the chrominance of the pixel to a preference chrominance to generate a preference pixel when the chrominance of the pixel is in the preference chrominance area. For example, the preference chrominance area may correspond to one of a circle and an ellipse.

The chrominance changing unit may move the chrominance of the pixel in a direction of a target chrominance based on a size of the circle or the ellipse and a distance between the chrominance of the pixel and the target chrominance in the two-dimensional chrominance plane.

The apparatus may further include a first color area converting unit configured to convert a format of the pixel signal from the RGB format to a luminance/chrominance format, and a second color area converting unit configured to convert a format of the preference pixel signal from a luminance/chrominance format to the RGB format. For example, the luminance/chrominance format may correspond to the YCbCr format.

The apparatus may further include a preference chrominance area setting unit configured to set the preference chrominance area. Also, the apparatus may further include a target chrominance setting unit configured to set a target chrominance.

In exemplary embodiments of the present invention an image displaying device includes an image source, a pixel color changing device configured to change a color of a pixel in the image source to a preference color to generate a preference pixel, and a display device configured to display the preference pixel signal. The pixel color changing unit includes a chrominance area determination to unit and a chrominance changing unit. The chrominance area determination unit is configured to determine whether chrominance of the pixel is in a preference chrominance area. The preference chrominance area is defined as a conic section in a two-dimensional chrominance plane and an eccentricity of the conic section is not greater than 1. The chrominance changing unit is configured to change the chrominance of the pixel to the preference chrominance to generate the preference pixel when the chrominance of the pixel is in the preference chrominance area.

The chrominance changing unit may move the chrominance of the pixel in a direction of a target chrominance based on a size of the conic section and a distance between the chrominance of the pixel and the target chrominance in the two-dimensional chrominance plane. The conic section includes a circle or an ellipse.

The pixel color changing device may include a first color area converting unit configured to convert a format of the pixel from the ROB format to a luminance/chrominance format, and a second color area converting unit configured to convert a format of the preference pixel from a luminance/chrominance format to the RGB format. For example, the luminance/chrominance format may correspond to the YCbCr format.

The image displaying device may further include a preference chrominance area setting unit configured to set the preference chrominance. Also, the image displaying device may further include a target chrominance setting unit configured to set a target chrominance.

Therefore, exemplary embodiments according to the present invention to may set a preference chrominance area in a simple manner, and hardware for setting the preference chrominance area may be easily implemented.

Also, exemplary embodiments according to the present invention may adaptively determine a preference chrominance regardless of a color position, because the chrominance is determined based on a distance between a target chrominance and a chrominance of a pixel.

BRIEF DESCRIPTION OF THE DRAWINGS

Exemplary embodiments of the present invention will be understood in more detail from the following descriptions taken in conjunction with the accompanying drawings.

DESCRIPTION OF EXEMPLARY EMBODIMENTS

Exemplary embodiments of the present invention now will be described more fully with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those of ordinary skill in the art. Like reference numerals refer to like elements throughout this application.

A change of luminance is more easily recognized by a user than a change of chrominance. Thus, when a pixel color is changed, changing the pixel color in a luminance/chrominance plane may be preferable to changing the pixel color in an RGB area. For example, a luminance/chrominance coordinate system may include a YCbCr coordinate system, a YUV coordinate system, and a YIQ coordinate system. The YCbCr coordinate system is adopted in an ITU-RBT.601 standard to develop a digital signal compatible with NTSC, PAL and SECAM. The YUV coordinate system is used in the PAL and SECAM systems. The YIQ coordinate system is used in the NTSC system. Hereinafter, for the sake of convenience, the YCbCr coordinate system will be described as an example of the luminance/chrominance coordinate system.

Figure 1:
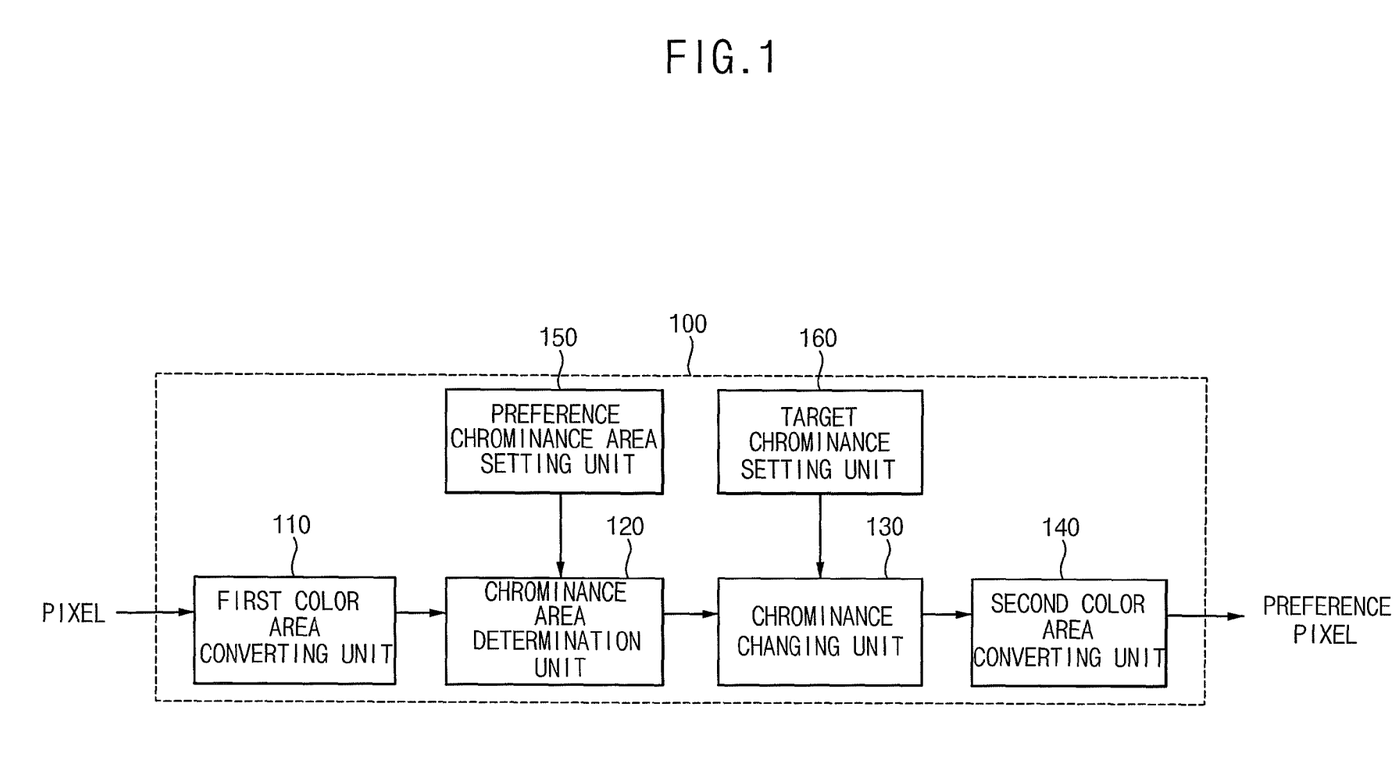
FIG. 1 is a block diagram illustrating a configuration of a pixel color changing device according to an exemplary embodiment of the present invention.

FIG. 1 is a block diagram illustrating a configuration of a pixel color changing device according to an exemplary embodiment of the present invention.

The pixel color changing device 100 changes a pixel color having a chrominance included in a preference chrominance area. The preference chrominance area may be set by a user. The pixel color changing device 100 to changes the pixel color in a luminance/chrominance area.

The pixel color changing device 100 includes a chrominance area determination unit 120 and a chrominance changing unit 130.

The chrominance area determination unit 120 determines whether a chrominance of the pixel is included in a preference chrominance area that is defined in a two-dimensional chrominance plane, and the chrominance changing unit 130 changes the pixel to a preference pixel when the chrominance of the pixel is in the preference chrominance area.

The pixel color changing device 100 may further include a first color area converting unit 110 and a second color area converting unit 140. The first color area converting unit 110 converts an original format of the pixel into a luminance/chrominance format when the pixel is not represented as a luminance/chrominance format, and the second color area converting unit 140 converts the format of the preference pixel into the original format. For example, when the pixel is represented in the RGB format, the first color area converting unit 110 converts the format of the pixel from the RGB format to a luminance/chrominance format, for example, the YCbCr format, and the second color area converting unit 140 converts the format of the preference pixel from a luminance/chrominance format to the RGB format.

When the pixel is represented in the YCbCr format, the first color area converting unit 110 and the second color area converting unit 140 may not be necessary.

The chrominance area determination unit 120 determines whether the chrominance of the pixel (Cb, Cr) is in the preference chrominance area that is to defined in the two-dimensional chrominance plane. The chrominance changing unit 130 changes the chrominance of the pixel (Cb, Cr) to the preference chrominance (Cb', Cr') of the pixel when the chrominance of the pixel is in the preference chrominance area.

In a mobile or portable device, it is desirable that the preference chrominance area be simply defined. The pixel color changing device 100 defines the preference chrominance area as a two-dimensional conic section of which an eccentricity is less than 1. The two-dimensional conic section having an eccentricity less than 1 may include an ellipse and a circle. A circle is defined by a center and a radius. The definition of an ellipse is more complex than that of the circle, and for the sake of convenience, a major axis of the ellipse is assumed to be in a horizontal direction or in a vertical direction in the two-dimensional chrominance plane. An ellipse may be defined by Equation 1.

$$\frac{(x-a)^2}{p^2} + \frac{(y-b)^2}{q^2} = 1,$$ [Equation 1]

where x and y indicate variables respectively representing Cb and Cr indicating a chrominance in the two-dimensional chrominance plane, a and b indicate a center coordinate of the ellipse, and p and q are real numbers indicating the longest radius and the shortest radius of the ellipse.

When p is equal to q, the Equation 1 represents a circle having a center point of (a, b) and a radius of p.

When the preference chrominance area is defined as an ellipse in Equation 1, the chrominance area determination unit 120 determines that the chrominance of the pixel is in the preference chrominance area if Equation 2 set forth below is satisfied.

$$\frac{(Cb-a)^2}{p^2} + \frac{(Cr-b)^2}{q^2} \leq 1,$$ [Equation 2]

where (Cb, Cr) indicates the chrominance of the pixel.

The preference chrominance area is set by a preference chrominance area setting unit 150 and the preference chrominance area may be set or changed by a user.

The chrominance changing unit 130 moves the chrominance of the pixel in a direction of a target chrominance in order to change the chrominance of the pixel to the preference chrominance when the chrominance of the pixel is in the preference chrominance area. The chrominance changing unit 130 generates the preference pixel by changing the chrominance of the pixel to the preference chrominance. The target chrominance may be set by a target chrominance setting unit 160.

Figure 2:
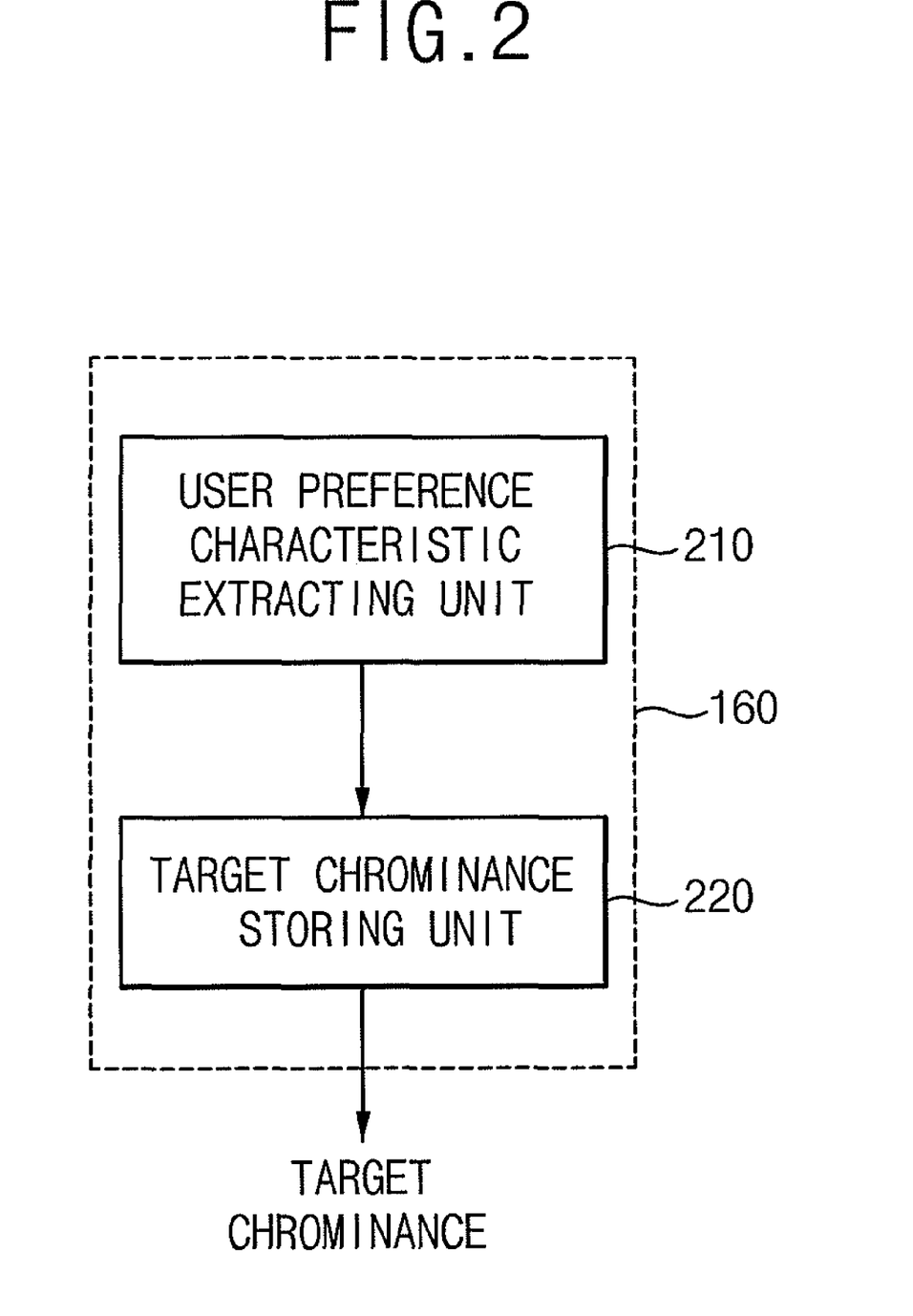
FIG. 2 is a block diagram illustrating a configuration of the target chrominance setting unit shown in FIG. 1.

FIG. 2 is a block diagram illustrating an exemplary embodiment of the target chrominance setting unit shown in FIG. 1.

Referring to FIG. 2, the target chrominance setting unit 160 may include a user preference characteristic extracting unit 210 and a target chrominance storing unit 220.

The user preference characteristic extracting unit 210 extracts user preference chrominance information. For example, when a user selects a to preference color image in the RGB format, the user preference characteristic extracting unit 210 may evaluate the user preference color image to generate the target chrominance. The target chrominance storing unit 220 stores the generated target chrominance.

Figure 3:
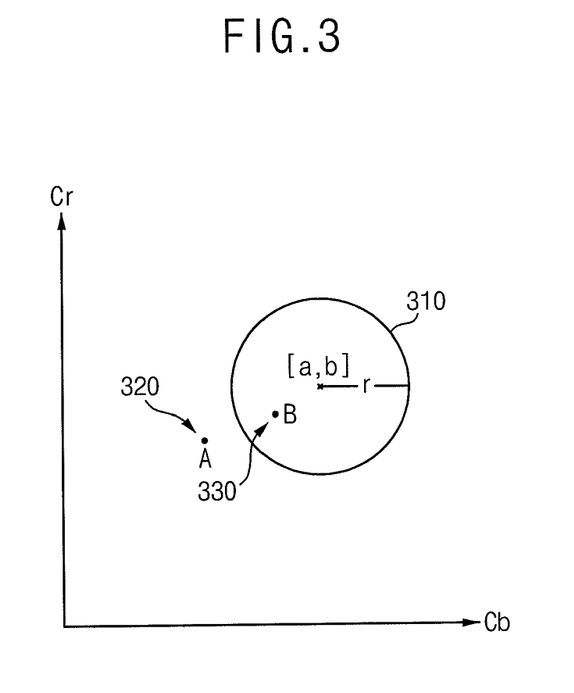
FIG. 3 is a diagram for describing the preference chrominance area.

FIG. 3 is a diagram useful in describing the preference chrominance area.

For the sake of convenience, the preference chrominance area is defined as a circle in a two-dimensional chrominance plane. In FIG. 3, the horizontal axis corresponds to a Cb axis and the vertical axis corresponds to a Cr axis in the two-dimensional chrominance plane.

The preference chrominance area 310 is defined as a circle having a center point of (a, b) and a radius of r. The chrominance changing unit 130 does not change the chrominance of a pixel A 320 because the chrominance of the pixel A 320 is not in the preference chrominance area 310. On the other hand, the chrominance changing unit 130 does change the chrominance of a pixel B 330 because the chrominance of the pixel B 330 is in the preference chrominance area 310.

Figure 4:
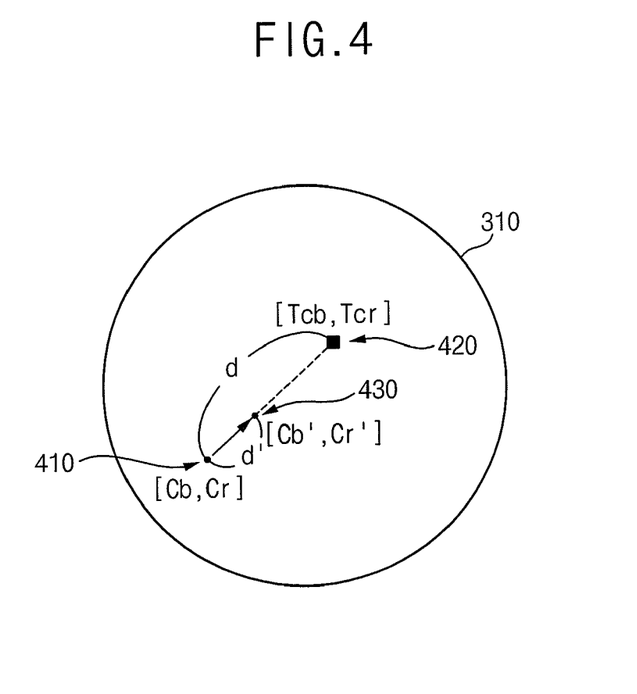
FIG. 4 is a diagram for describing a procedure of changing a chrominance.

FIG. 4 is a diagram useful in describing a procedure of changing a chrominance.

The chrominance changing unit 130 moves a chrominance of the pixel (Cb, Cr) 410 in a direction of a target chrominance (Tcb, Tcr) 420 so as to change the chrominance of the pixel (Cb, Cr) 410 to the preference chrominance (Cb', Cr') 430, based on a distance d between the chrominance of the pixel (Cb, Cr) 410 and the target chrominance ($T_{cb}$, $T_{cr}$) 420, and a size of the circle defining the to preference chrominance area 310. In a two-dimensional chrominance plane, the distance d between the chrominance of the pixel (Cb, Cr) 410 and the target chrominance ($T_{cb}$, $T_{cr}$) 420 may satisfy the following algorithm.

```
If (d_cb<r/2 and d_cr<r/2)
    d'=alpha_low*d
else
    d'=alpha_high*d−(1−alpha_low)*r
    alpha_high=1+(1−alpha_low)
```

In the above algorithm, d indicates (Cb-Tcb, Cr-Tcr)

The preference chrominance (Cb', Cr') 430 may be obtained by the following Equation 3.

$$(Cb',Cr')=d'+(Tcb+Tcr)$$ [Equation 3]

The alpha_low may be limited as $2^{-n}$ (n is a natural number) so as to decrease the complexity of the hardware. An accumulation and a multiplication of the $2^{-n}$ may be simply performed by using a barrel shifter.

Figure 5:
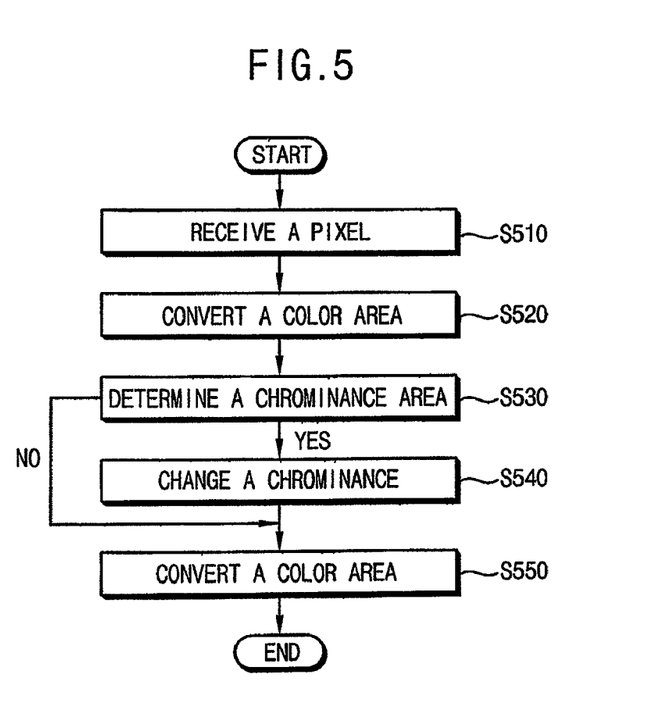
FIG. 5 is a flow chart illustrating a procedure of changing a pixel color.

FIG. 5 is a flow chart illustrating a procedure of changing a pixel color.

The chrominance changing unit 130 shown in FIG. 1 receives a pixel, that is, a pixel signal or pixel data, (Step S510). The pixel may be represented in the RGB format.

The chrominance changing unit 130 converts a format of the received pixel to a luminance/chrominance format (Step S520), because the chrominance changing unit 130 uses the chrominance of the pixel to determine whether the received pixel is in the preference chrominance area.

The chrominance changing unit 130 determines whether the chrominance of the received pixel is in the preference chrominance area (Step S530). The preference chrominance area may be defined as a circle or an ellipse in a two dimensional chrominance plane. The circle and the ellipse may be derived from a conic section. When the preference chrominance area is defined as a circle, an eccentricity is equal to 0, and when the preference chrominance area is defined as an ellipse, the eccentricity is greater than 0 and less than 1.

Figure 6:
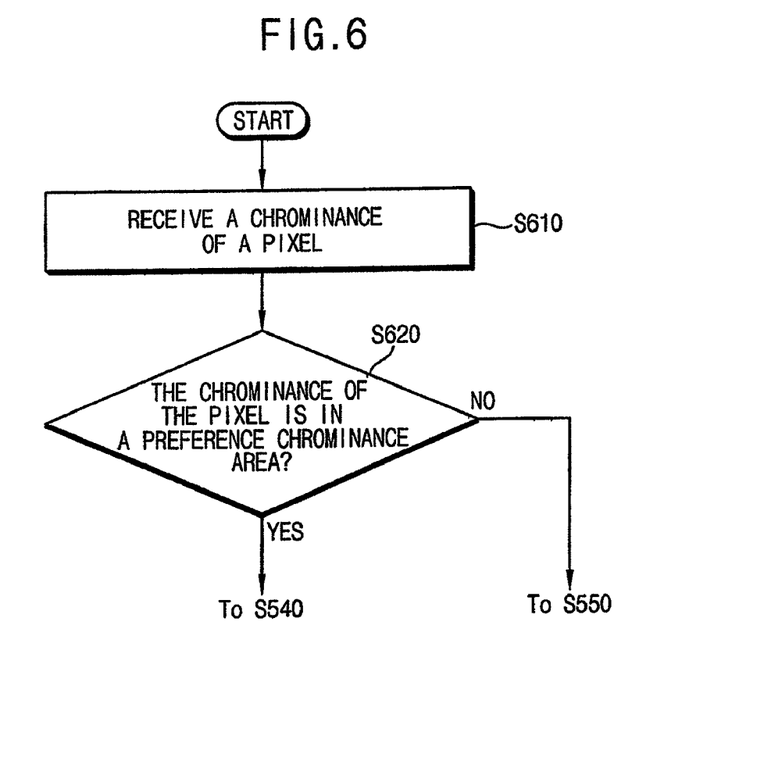
FIG. 6 is a flow chart illustrating a procedure of determining a chrominance area.

FIG. 6 is a flow chart illustrating a procedure of determining a chrominance area.

Referring to FIG. 6, determining whether the chrominance of the received pixel is in the preference chrominance area (Step S530) includes receiving the chrominance of the received pixel (Step 610) and determining whether the chrominance of the received pixel is in the preference chrominance area (Step S620).

When the chrominance of the received pixel is in the preference chrominance area, the chrominance changing unit 130 converts the chrominance of the received pixel to the preference chrominance (Step S540) and performs a color area converting operation (Step S550).

When the chrominance of the input pixel signal is not in the preference chrominance areas however, the chrominance changing unit 130 performs a color area converting operation without converting the chrominance of the received to pixel to the preference chrominance (Step S550).

Figure 7:
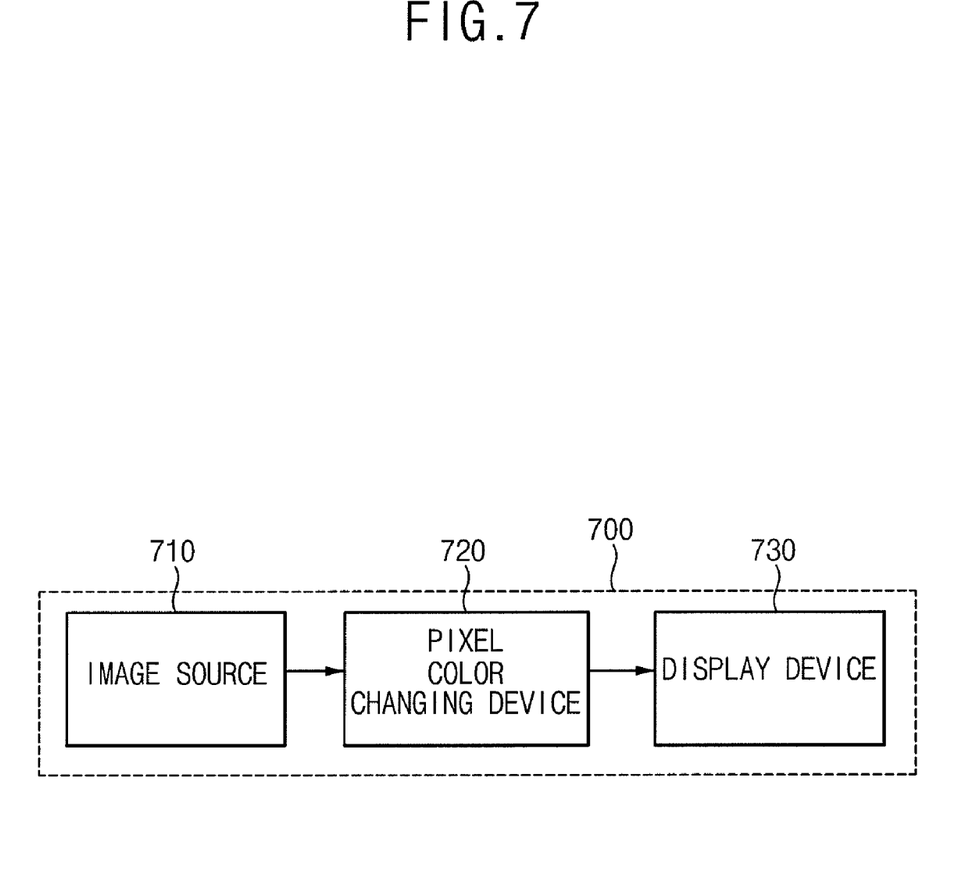
FIG. 7 is a block diagram illustrating a configuration of an image displaying device according to an exemplary embodiment of the present invention.

FIG. 7 is a block diagram illustrating a configuration of an image displaying device according to an exemplary embodiment of the present invention.

Referring to FIG. 7, the image displaying device 700 includes an image source 710, a pixel color changing device 720 and a display device 730.

The image source 710 provides a pixel, the pixel color changing device 720 changes a pixel color to a preference color to generate a preference pixel, and the display device 730 displays the preference pixel signal.

The pixel color changing device 720 changes the pixel color having a chrominance in a preference chrominance area that is set by a user. The pixel color changing device 720 changes the chrominance without changing a luminance in a luminance/chrominance area. The pixel color changing device 720 in the image displaying device 700 may be implemented by using the pixel color changing device 100 of FIG. 1.

Exemplary embodiments of the present invention may set a preference chrominance area in a simple manner, and hardware for setting the preference chrominance area may be easily implemented.

Also, exemplary embodiments of the present invention may adaptively determine a preference chrominance regardless of a color position because the chrominance is determined based on a distance between a target chrominance and a chrominance of a pixel.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method of changing a pixel color, comprising:
upon determining that a chrominance of a pixel is in a preference chrominance area, wherein the preference chrominance area is defined as a circle in a two-dimensional chrominance plane, changing the chrominance of the pixel to a preference chrominance to generate a preference pixel, wherein the changing comprises:
determining a distance between the chrominance of the pixel and a target chrominance within the preference chrominance area;
determining whether the distance is less than one half the radius of the circle;
setting an adjustment value based on the distance when the distance is determined to be less than one half the radius;
setting the adjustment value based on a difference between a first value and a second value when the distance is determined to be greater than or equal to one half the radius; and
adjusting the chrominance of the pixel based on the adjustment value and the target chrominance,
wherein the first value is based on the distance and the second value is based on the entire radius.

2. The method of claim 1, wherein changing the chrominance of the pixel to the preference chrominance comprises moving the chrominance of the pixel in a direction towards the target chrominance in the two-dimensional chrominance plane.

3. The method of claim 1, further comprising:
converting a format of the pixel from an RGB format to a luminance/chrominance format to provide the chrominance of the pixel; and
converting a format of the preference pixel from the luminance/chrominance format to the RGB format.

4. The method of claim 3, wherein the luminance/chrominance format corresponds to a YCbCr format.

5. The method of claim 1, further comprising:
changing the radius of the preference chrominance area; and
re-executing the steps of claim 1.

6. The method of claim 1, further comprising:
changing the target chrominance; and
re-executing the steps of claim 1.

7. The method of claim 1, wherein the adjustment value set based on the distance when the distance is determined to be less than one half the radius is further set based on a multiplier of $2^{\text{'}}$, wherein n is a natural number.

8. The method of claim 1, wherein the first value is further based on a first multiplier, the second value is further based on a second multiplier, wherein the first multiplier equals $1+(1-2^{-n})$, the second multiplier equals $(1-2^{-n})$, and wherein n is a natural number.

9. A method of changing a pixel color, comprising:
upon determining that a chrominance of a pixel is in a preference chrominance area, wherein the preference chrominance area is defined as a circle in a two-dimensional chrominance plane, changing the chrominance of the pixel to a preference chrominance to generate a preference pixel wherein the changing comprises:
moving the chrominance of the pixel in a direction towards a target chrominance within the preference chrominance area based on a size of the circle and a distance between the chrominance of the pixel and the target chrominance in the two-dimensional chrominance plane, wherein the moving comprises:
determining a distance between the chrominance of the pixel and the target chrominance;
determining whether the distance is less than one half the radius of the circle;
setting an adjustment value based on the distance when the distance is determined to be less than one half the radius;
setting the adjustment value based on a difference between a first value and a second value when the distance is determined to be greater than or equal to one half the radius; and
adjusting the chrominance of the pixel based on the adjustment value and the target chrominance,
wherein the first value is based on the distance and the second value is based on the radius.

10. The method of claim 9, wherein the adjustment value set based on the distance when the distance is determined to be less than one half the radius further is further set based on a multiplier of $2^{-n}$, wherein n is a natural number.

11. The method of claim 9, wherein the first value is further based on a first multiplier, the second value is further based on a second multiplier, wherein the first multiplier equals $1+(1-2^{-n})$, the second multiplier equals $(1-2^{-n})$, and wherein n is a natural number.

12. A method of changing a pixel color, comprising:
upon determining that a chrominance of a pixel is in a preference chrominance area, wherein the preference chrominance area is defined as a conic section in a two-dimensional chrominance plane, changing the chrominance of the pixel to a preference chrominance to generate a preference pixel, wherein the changing comprises:

determining a distance between the chrominance of the pixel and a target chrominance within the preference chrominance area;

determining whether the distance is less than one half a radius of the conic section;

setting an adjustment value based on the distance when the distance is determined to be less than one half the radius and setting the adjustment value based on a difference between a first value and a second value when the distance is otherwise; and adjusting the chrominance of the pixel based on the adjustment value and the target chrominance, wherein first value is based on the distance and the second value is based on the entire radius.

13. The method of claim 12, wherein the conic section is an ellipse.

14. The method of claim 12, wherein the adjustment value set based on the distance when the distance is determined to be less than one half the radius is further set based on a multiplier of $2^{-n}$, wherein n is a natural number.

15. The method of claim 12, wherein the first value is further based on a first multiplier and the second value is further based on a second multiplier, wherein the first multiplier equals $1+(1-2^{-n})$, the second multiplier equals $1-2^{-n}$, and wherein n is a natural number.

* * * * *